Patented Feb. 9, 1937

2,069,962

UNITED STATES PATENT OFFICE 2,069,962

CELLULOSE ORGANIC ESTER COMPOSITIONS CONTAINING ETHERS OF DIOXANEDIOL

James G. McNally and John J. Schmitt, Rochester, N. Y., assignors, by mesne assignments, to Eastman Kodak Company, Jersey City, N. J., a corporation of New Jersey No Drawing. Application May 29, 1936, Serial No. 82,624

10 Claims. (Cl. 106—40)

This invention relates to compositions of matter in which cellulose organic acid esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of our invention is to produce compositions which can be molded at elevated temperatures and high pressures to produce plastic products having the desirable properties of celluloid. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible or at least not sufficiently compatible with cellulose acetate to be used as plasticizers in cellulose acetate compositions.

We have discovered that valuable properties may be induced in and/or contributed to compositions containing organic acid esters of cellulose, such as cellulose acetate, by adding thereto, as a plasticizing compound, a diether of dioxanediol, such, for instance, as dioxanediol dimethyl ether, dioxanediol diethyl ether, dioxanediol dibutyl ether, dioxanediol dioctyl ether, dioxanediol dibenzyl ether, or dioxanediol dicyclohexyl ether. The particularly useful properties which these compounds induce in or contribute to cellulosic compositions containing them are hereinafter enumerated:

The diethers of dioxanediol may be prepared from dichloro dioxane, whose preparation has been described by Böeseken, Tellegen and Henriquez in the Journal of the American Chemical Society 55, 1284–8 (1933). The diethers of dioxanediol are thought to have the general structural formula

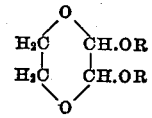

The following examples will illustrate how they may be prepared from dichlorodioxane.

*Example I.—Dioxanediol di-n-butyl ether*

200 grams (2.7 gram-moles) of n-butyl alcohol and 204 grams (1.3 gram-moles) of 2:3-dichloro dioxane are placed in a 1-liter flask fitted with a Liebig condenser and means for removing hydrogen chloride. The reaction mixture is heated in an oil bath until the butyl alcohol refluxes slowly. Hydrogen chloride is evolved. The brown-colored reaction product is fractionated under reduced pressure. Dioxanediol di-n-butyl ether distills over as a colorless liquid boiling at 131–134° C. at 10 mm. pressure.

*Example II.—Dioxanediol di-cyclohexyl ether*

200 grams (2 gram-moles) of cyclohexanol is heated with 157 grams (1 gram-mole of 2:3-dichloro dioxane. After the reaction is started, it continues with the evolution of heat. Heating is continued for about 3 hours. The reddish-brown reaction mixture is distilled in a high vacuum. The boiling range, 165–215° C., at 3 mm. pressure, indicates the presence of a number of isomers of dioxanediol di-cyclohexyl ether.

The boiling points of the other diethers of dioxanediol mentioned above are as follows:

Dioxanediol dimethyl ether 85–100° C. at 18 mm. pressure
Dioxanediol diethyl ether 95–105° C. at 17 mm. pressure
Dioxanediol dioctyl ether 160–165° C. at 10 mm. pressure
Dioxanediol dibenzyl ether 175–190° C. at 2 mm. pressure In order that those skilled in this art may better understand our invention we would state, by way of illustration, that for the manufacture of photographic film base or other sheets our new compositions of matter may be compounded as follows: 100 parts of acetone-soluble cellulose acetate, i. e., cellulose acetate containing from about 36% to 42% acetyl radical, approximately, is dissolved with stirring at atmospheric temperature in 300 to 500 parts, preferably 400 parts, by weight, of acetone. To this solution may be added from 5 to 50 parts by weight of one of the diethers of dioxanediol, such, for instance, as the dimethyl, diethyl, dibutyl, dioctyl, dibenzyl or dicyclohexyl ether of dioxanediol. Within the limits stated, the amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with our invention are very tough and flexible, and maintain flexibility in a superior fashion.

Other similar solvents (instead of acetone) which are compatible with the cellulose acetate and our new plasticizers will also occur to those skilled in this art, such as ethylene chloride-alcohol mixtures. In like manner these plasticizers may be compounded with other single organic acid esters of cellulose, such as cellulose propionate, butyrate, stearate and the like, or with mixed organic acid esters, such as cellulose acetate-stearate, cellulose acetate-propionate, cellulose acetate-butyrate, cellulose acetate-lactate, cellulose acetate-tartrate or the like, a suitable solvent which will dissolve both the cellulosic derivative and the plasticizer being employed, such, for instance, as an alkylene chloride with or without the addition of alcohol. Other substances, such as fire-retardents, evaporation-retardents, etc. may be added to the film-forming compositions.

We give below a few examples of film-forming compositions containing our novel plasticizers.

*Example III.—*                                  Parts
  Cellulose acetate_____ 100
  Triphenyl phosphate_____ 5
  Dioxanediol dimethyl ether_____ 15
  Acetone_____ 400

*Example IV.—*
  Cellulose acetate_____ 100
  Dioxanediol diethyl ether_____ 30
  Acetone_____ 400

*Example V.—*
  Cellulose acetate-propionate (16% propionyl)_____ 100
  Dioxanediol dibutyl ether_____ 30
  Ethylene chloride_____ 500
  Ethyl alcohol_____ 50

*Example VI.—*
  Cellulose acetate-propionate (16% propionyl)_____ 100
  Dioxanediol dicyclohexyl ether_____ 25
  Propylene chloride_____ 500
  1:4-dioxane _____ 100

*Example VII.—*
  Benzyl cellulose_____ 100
  Dioxanediol dibenzyl ether_____ 15
  Ethyl acetate_____ 300
  Benzene _____ 200
  Ethyl alcohol_____ 100

*Example VIII.—*
  Cellulose acetate-stearate (33% stearyl) 100
  Dioxanediol dioctyl ether_____ 15
  Ethylene chloride_____ 400
  Methyl alcohol_____ 100
  Monomethyl ether of ethylene glycol_____ 100

Our novel plasticizers may also be advantageously used as plasticizers in cellulose organic acid ester molding compositions. For instance, when about 25 to 45% (parts by weight per 100 parts of cellulose acetate) of any of the above-mentioned diethers of dioxanediol is homogeneously mixed with cellulose acetate, the mixture may be converted into a hard, transparent or translucent plastic product by molding at a temperature of 140–160° C. and a pressure of 2500 to 4000 pounds per square inch for a period of from 2 to 5 minutes, in a manner already known to those skilled in molding compounds of that nature. Mixtures of the dioxanediol diethers with each other or with other plasticizers may be used. The dioxanediol diethers have the advantage of being very stable and not corroding the molds.

Moreover, I have found that, upon the addition to cellulose acetate of approximately 100% of the dimethyl, diethyl, dibutyl or dicyclohexyl ether of dioxanediol, unexpected compatibility of the plasticizer with the cellulose acetate exists. Contrary to experience in most cases where such a large proportion of plasticizer is used, no exudation or crystallizing out of the plasticizer occurs. In some cases, even more than 100% of the plasticizer may be added. Dioxanediol dioctyl ether is compatible with cellulose acetate to the extent of 50% of the cellulose acetate, and dioxanediol dibenzyl ether is compatible with cellulose acetate to the extent of 80% of the weight of the cellulose acetate.

What we claim as our invention and desire to be secured by Letters Patent of the United States is:

1. A composition of matter comprising a cellulose organic acid ester and a dioxanediol diether.
2. A composition of matter comprising a cellulose organic acid ester and a dioxanediol dialkyl ether.
3. A composition of matter comprising a cellulose organic acid ester and dioxanediol dibenzyl ether.
4. A composition of matter comprising a cellulose organic acid ester and dioxanediol dicyclohexyl ether.
5. A composition of matter comprising cellulose acetate and a dioxanediol diether.
6. A composition of matter comprising 100 parts of cellulose acetate and from 5 to 100 parts, by weight, of a lower dialkyl ether of dioxanediol.
7. A flexible, transparent sheet comprising 100 parts of a cellulose organic acid ester and, as a plasticizer therefor, about 5 to 50 parts, by weight, of a dioxanediol diether.
8. A flexible, transparent sheet comprising 100 parts of cellulose acetate and, as a plasticizer therefor, about 5 to 50 parts by weight, of a dioxanediol diether.
9. A molding composition adapted for molding under elevated temperatures and high pressures, comprising a cellulose organic acid ester and a dioxanediol diether.
10. A molding composition adapted for molding under elevated temperatures and high pressures, comprising cellulose acetate and a dioxanediol diether.

JAMES G. McNALLY.
JOHN J. SCHMITT.